(12) United States Patent
Xu et al.

(10) Patent No.: US 12,086,336 B2
(45) Date of Patent: Sep. 10, 2024

(54) THIN FILM SENSOR AND METHOD FOR PREPARING THE SAME

(71) Applicants: Hefei Xinsheng Optoelectronics Technology Co., Ltd., Anhui (CN); BOE Technology Group Co., Ltd., Beijing (CN)

(72) Inventors: Wenjie Xu, Beijing (CN); Feifei Yu, Beijing (CN); Xiaodong Xie, Beijing (CN); Jing Wang, Beijing (CN); Tengfei Zhong, Beijing (CN); Huayu Sang, Beijing (CN); Xue Zhao, Beijing (CN); Bin Pang, Beijing (CN); Xinxiu Zhang, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/771,655

(22) PCT Filed: May 24, 2021

(86) PCT No.: PCT/CN2021/095374
§ 371 (c)(1),
(2) Date: Apr. 25, 2022

(87) PCT Pub. No.: WO2022/246585
PCT Pub. Date: Dec. 1, 2022

(65) Prior Publication Data
US 2024/0264685 A1    Aug. 8, 2024

(51) Int. Cl.
*G06F 3/041* (2006.01)

(52) U.S. Cl.
CPC .... *G06F 3/041* (2013.01); *G06F 2203/04112* (2013.01)

(58) Field of Classification Search
CPC .................. G06F 3/041; G06F 2203/04112
See application file for complete search history.

(56) References Cited

U.S. PATENT DOCUMENTS

| 11,861,110 B1 * | 1/2024 | Kitsomboonloha ........................ G06F 3/04182 |
| 2014/0253495 A1 * | 9/2014 | Kang ..................... G06F 3/0443 345/174 |

(Continued)

FOREIGN PATENT DOCUMENTS

| CN | 103413593 A | 11/2013 |
| CN | 104460169 A | 3/2015 |

(Continued)

*Primary Examiner* — Paresh Patel
(74) *Attorney, Agent, or Firm* — Nath, Goldberg & Meyer; Joshua B. Goldberg

(57) ABSTRACT

The present disclosure provides a thin film sensor and a method for preparing a thin film sensor. The thin film sensor includes: a base substrate; a first conductive mesh on the base substrate; where the first conductive mesh includes first metal wires arranged side by side along a first direction and each extending in a second direction, and second metal wires each extending in a third direction; and the first metal wires intersect with the second metal wires; and a second conductive mesh on a side of the first conductive mesh away from the base substrate; where the second conductive mesh includes first transparent conductive wires arranged side by side along the first direction and each extending in the second direction, and second transparent conductive wires each extending in the third direction; and the first transparent conductive wires intersect with the second transparent conductive wires.

20 Claims, 7 Drawing Sheets

(56) References Cited

U.S. PATENT DOCUMENTS

2015/0016070 A1    1/2015   Chang
2020/0142530 A1    5/2020   Lee et al.

FOREIGN PATENT DOCUMENTS

| CN | 104679322 A | 6/2015 |
| CN | 105094401 A | 11/2015 |
| CN | 106919278 A | 7/2017 |
| CN | 108228003 A | 6/2018 |
| CN | 109407869 A | 3/2019 |
| CN | 110502147 A | 11/2019 |
| CN | 112445360 A | 3/2021 |
| CN | 112635980 A | 4/2021 |

\* cited by examiner

THIN FILM SENSOR AND METHOD FOR PREPARING THE SAME

This is a National Phase Application filed under 35 U.S.C. 371 as a national stage of PCT/CN2021/095374, filed May 24, 2021, the content of which is hereby incorporated by reference in its entirety.

TECHNICAL FIELD

The present disclosure relates to the field of sensor technology, and specifically relates to a thin film sensor and a method for preparing a thin film sensor.

BACKGROUND

With the development of Internet of Things and communication technologies, the demand of thin film sensors, such as thin film antennas, is increasing. In order to achieve a better integration with living scenarios, transparent antennas are favored. For example, transparent antennas may be integrated into building glass, glass of rail transit or automobile glass or the like, which can not only ensure a normal line of sight, but also facilitate information transmission and interconnection of everything, thereby making life more convenient.

SUMMARY

To solve at least one of technical problems in the existing art, the present disclosure provides a thin film sensor and a method for preparing a thin film sensor.

In a first aspect, an embodiment of the present disclosure provides a thin film sensor, including:
  a base substrate;
  a first conductive mesh on the base substrate; where the first conductive mesh includes a plurality of first metal wires arranged side by side along a first direction and each extending in a second direction, and a plurality of second metal wires arranged side by side along the first direction and each extending in a third direction; and the plurality of first metal wires intersect with the plurality of second metal wires;
  a second conductive mesh on a side of the first conductive mesh away from the base substrate; where the second conductive mesh includes a plurality of first transparent conductive wires arranged side by side along the first direction and each extending in the second direction, and a plurality of second transparent conductive wires arranged side by side along the first direction and each extending in the third direction; and the plurality of first transparent conductive wires intersect with the plurality of second transparent conductive wires; and
  each of the plurality of first transparent conductive wires has an orthographic projection on the base substrate covering an orthographic projection of one of the plurality of first metal wires on the base substrate; and each of the plurality of second transparent conductive wires has an orthographic projection on the base substrate covering an orthographic projection of one of the plurality of second metal wires on the base substrate.

In some implementations, the thin film sensor further includes:
  a shadow eliminating layer between the base substrate and a layer where the first conductive mesh is located, and the shadow eliminating layer has substantially the same refractive index as the second conductive mesh.

In some implementations, the thin film sensor further includes:
  a buffer layer between the base substrate and a layer where the first conductive mesh is located.

In some implementations, the thin film sensor further includes:
  a first dielectric layer on the base substrate, where the first dielectric layer is provided with a plurality of first groove parts arranged side by side along the first direction and each extending in the second direction, and a plurality of second groove parts arranged side by side along the first direction and each extending in the third direction; the plurality of first groove parts intersect with the plurality of second groove parts; the first metal wires are filled in the first groove parts, and each first groove part is filled with one first metal wire; and the second metal wires are filled in the second groove parts, and each second groove part is filled with one second metal wire.

In some implementations, the thin film sensor further includes:
  a planarization layer on a side of the second conductive mesh away from the base substrate.

In some implementations, each of the first metal wires and the second metal wires has a first wire width; each of the first transparent conductive wires and the second transparent conductive wires has a second wire width; and a ratio of the first wire width to the second wire width ranges from 1:2 to 1:60.

In some implementations, the first wire width has a value ranging from 1 Lm to 3 µm; and the second wire width has a value ranging from 10 µm to 50n.

In some implementations, the thin film sensor further includes:
  a first redundant conductive mesh in the same layer as the first conductive mesh and disconnected from the first conductive mesh; where the first redundant conductive mesh includes a plurality of first redundant metal wires arranged side by side along the first direction and each extending in the second direction, and a plurality of second redundant metal wires arranged side by side along the first direction and each extending in the third direction; each of the first redundant metal wires is broken, in the direction in which the first redundant metal wire extends, at an intersection at which the first redundant metal wire intersects with the second redundant metal wires, and each of the second redundant metal wires is broken, in the direction in which the second redundant metal wire extends, at an intersection at which the second redundant metal wire intersects with the first redundant metal wires:
  a redundant conductive layer in the same layer as the second conductive mesh and disconnected from the second conductive mesh; where an orthographic projection of the redundant conductive laver on the base substrate covers an orthographic projection of the first redundant conductive mesh on the base substrate.

In some implementations, the thin film sensor further includes:
  a connection pad including a first sub-structure and a second sub-structure sequentially arranged in a direction away from the base substrate; the first sub-structure is disposed in the same layer as the first conductive mesh, and is electrically connected to the first conductive mesh; and the second sub-structure is disposed in the same layer as the second conductive mesh and covers the first sub-structure.

In some implementations, the first metal wires and the second metal wires each are made of a material including at least one of copper, aluminum, molybdenum or silver.

In some implementations, the first transparent conductive wires and the second transparent conductive wires each are made of a material including indium tin oxide.

In some implementations, a ratio of a thickness of a layer where the first conductive mesh is located to a thickness of a layer where the second conductive mesh is located ranges from 3:2 to 18:1.

In some implementations, the first conductive mesh has a thickness ranging from 2000 Å to 7000 Å, and the second conductive mesh has a thickness ranging from 400 Å to 1350 Å.

In a second aspect, an embodiment of the present disclosure provides a method for preparing a thin film sensor, including:

providing a base substrate;

forming a first conductive mesh on the first base substrate; where the first conductive mesh includes a plurality of first metal wires arranged side by side along a first direction and each extending in a second direction, and a plurality of second metal wires arranged side by side along the first direction and each extending in a third direction; and the plurality of first metal wires intersect with the plurality of second metal wires;

forming a second conductive mesh on a side of the first conductive mesh away from the base substrate, where the second conductive mesh includes a plurality of first transparent conductive wires arranged side by side along the first direction and each extending in the second direction, and a plurality of second transparent conductive wires arranged side by side along the first direction and each extending in the third direction; and the plurality of first transparent conductive wires intersect with the plurality of second transparent conductive wires; and each of the plurality of first transparent conductive wires has an orthographic projection on the base substrate covering an orthographic projection of one of the plurality of first metal wires on the base substrate; and each of the plurality of second transparent conductive wires has an orthographic projection on the base substrate covering an orthographic projection of one of the plurality of second metal wires on the base substrate.

In some implementations, before forming the first conductive mesh, the method further includes:

forming a shadow eliminating layer on the base substrate, where a difference between a refractive index of the shadow eliminating layer and a refractive index of the second conductive mesh is less than 1%.

In some implementations, before forming the first conductive mesh, the method further includes:

forming a buffer layer on the base substrate,

In some implementations, before forming the first conductive mesh, the method further includes:

forming a first dielectric layer on the base substrate by micro-imprinting; where the first dielectric layer is provided with a plurality of first groove parts arranged side by side along the first direction and each extending in the second direction, and a plurality of second groove parts arranged side by side along the first direction and each extending in the third direction; the plurality of first groove parts intersect with the plurality of second groove parts; the first metal wires are filled in the first groove parts, and each first groove part is filled with one first metal wire; and the second metal wires are filled in the second groove parts, and each second groove part is filled with one second metal wire.

In some implementations, after forming the second conductive mesh, the method further includes:

forming a first planarization layer on a side of a layer, where the second conductive mesh is located, away from the base substrate.

In some implementations, a first redundant conductive mesh is formed simultaneously as the first conductive mesh; the first redundant conductive mesh is disconnected from the first conductive mesh; the first redundant conductive mesh includes a plurality of first redundant metal wires arranged side by side along the first direction and each extending in the second direction, and a plurality of second redundant metal wires arranged side by side along the first direction and each extending in the third direction; each of the first redundant metal wires is broken, in the direction in which the first redundant metal wire extends, at intersections at which the first redundant metal wire intersects with the second redundant metal wires, and each of the second redundant metal wires is broken, in the direction in which the second redundant metal wire extends, at intersections at which the second redundant metal wire intersects with the first redundant metal wires;

a redundant conductive layer is formed simultaneously with the second conductive mesh, the redundant conductive layer is disconnected from the second conductive mesh; and an orthographic projection of the redundant conductive layer on the base substrate covers an orthographic projection of the first redundant conductive mesh on the base substrate.

In some implementations, the method further includes forming a connection pad on the base substrate, including:

forming a first sub-structure of the connection pad simultaneously with the first conductive mesh, the first sub-structure being connected to the first conductive mesh, and forming a second sub-structure of the connection pad simultaneously with the second conductive mesh, the second sub-structure covering the first sub-structure.

DETAIL DESCRIPTION OF EMBODIMENTS

To improve understanding of the technical solution of the present disclosure for those skilled in the art, the present disclosure will be described in detail with reference to accompanying drawings and specific implementations.

Unless otherwise defined, technical or scientific terms used in the present disclosure are intended to have general meanings as understood by those of ordinary skill in the art. The words "first", "second" and similar terms used in the present disclosure do not denote any order, quantity, or importance, but are used merely for distinguishing different components. Also, the use of the terms "a", "an", or "the" and similar referents do not denote a limitation of quantity, but rather denote the presence of at least one element. The word "comprising" or "including" or the like means that the element or item preceding the word contains elements or items that appear after the word or equivalents thereof, but does not exclude other elements or items. The term "connected", "coupled" or the like is not restricted to physical or mechanical connections, but may include electrical connections, whether direct or indirect. The words "upper/on" "lower/below", "left", "right", or the like are merely used to indicate a relative positional relationship, and when an absolute position of the described object is changed, the relative positional relationship may be changed accordingly.

Figure 1:
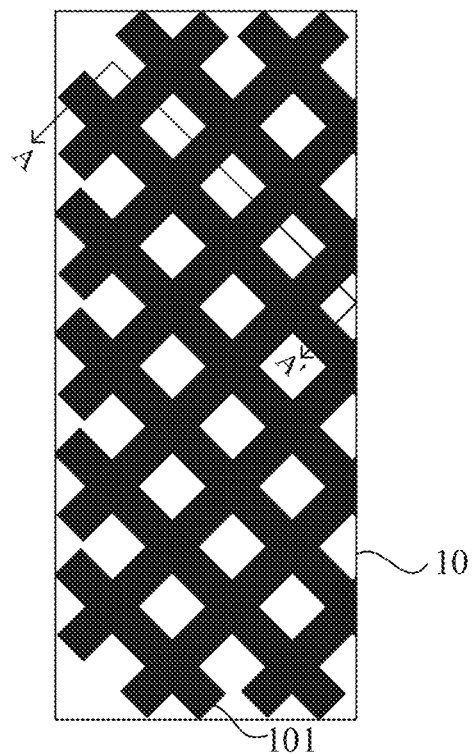
FIG. 1 is a schematic structural diagram of a thin film sensor.
Figure 2:
FIG. 2 is a schematic diagram of a sectional structure of the thin film sensor shown in FIG. 1 taken along A-A'.

FIG. 1 is a schematic structural diagram of a thin film sensor, FIG. 2 is a schematic diagram of a sectional structure of the thin film sensor shown in FIG. 1 taken along A-A'. As shown in FIGS. 1 and 2, the thin film sensor includes: a base substrate 10 provided with a first conductive layer 101 thereon. Taking the thin film sensor being a touch substrate as an example, the first conductive layer 101 may be a touch electrode layer. Apparently, in an embodiment of the present disclosure, the thin film sensor may be a transparent antenna, or the like, which are not enumerated here. To ensure a relatively good light transmittance of the first conductive layer 101, the first conductive layer 101 is desired to be patterned. For example, the first conductive layer 101 may be formed, by meshlines made of a metal material, into block electrodes with patterns of a rhombus shape, a triangle shape or the like, which are not enumerated here. When the thin film sensor is a transparent wire, a second conductive layer is further provided on a side of the base substrate 10 away from the first conductive layer 101, in such case, the first conductive layer 101 may be a radiation element, and the second conductive layer may be a ground layer. Like the first conductive layer 101, the second conductive layer may also be formed by meshlines, and hollow-out portions of the second conductive layer and the first conductive layer may be arranged correspondingly. However, in actual products, hollow-out portions of the second conductive layer and the first conductive layer may be deviated from each other to some extent.

As can be seen from FIG. 1, not an entire surface of the base substrate 10 is provided thereon with the first conductive layer 101, i.e., the meshlines. Any meshline is formed by electrically connected metal meshes. When the thin film sensor is applied in a flexible product, the metal mesh tends to be broken at nodes thereof during twisting and bending of the product. Therefore, an inorganic insulation layer is typically provided as a protective layer for protecting the metal mesh. However, it found that the thin film sensor cannot be curled in a large range due to a thickness of the inorganic insulation layer. In view of this, embodiments of the present disclosure provide the following solutions.

Figure 3:
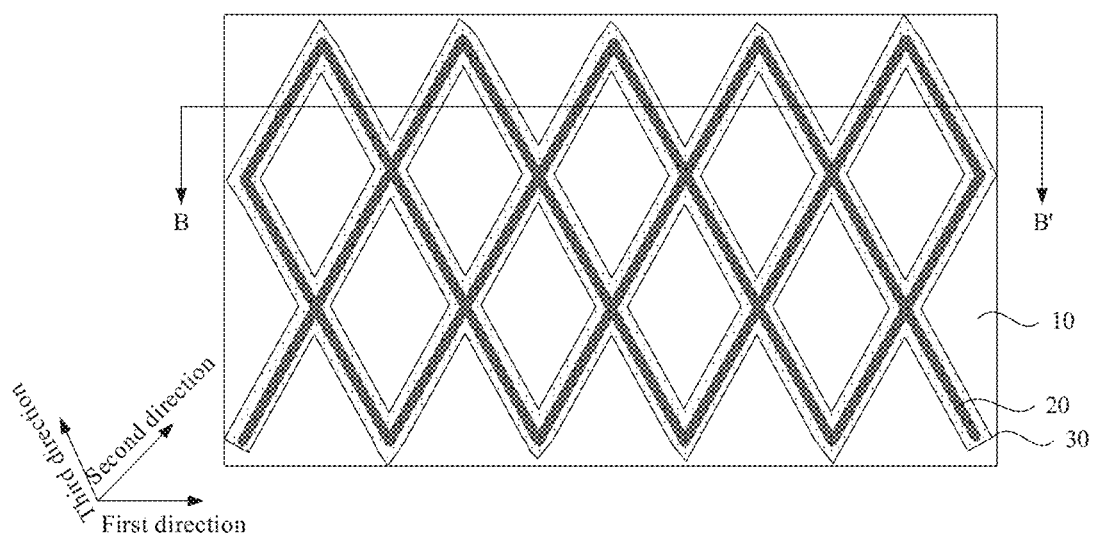
FIG. 3 is a schematic structural diagram of a thin film sensor according to an embodiment of the present disclosure.
Figure 4:
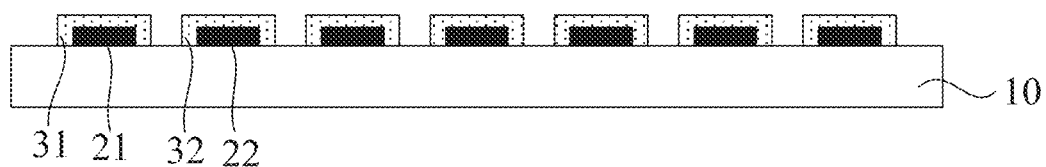
FIG. 4 is a schematic diagram of a sectional structure of the thin film sensor shown in FIG. 3 taken along B-B'

In a first aspect, FIG. 3 is a schematic structural diagram of a thin film sensor according to an embodiment of the present disclosure; and FIG. 4 is a schematic diagram of a sectional structure of the thin film sensor shown in FIG. 3 taken along B-B'. As shown in FIGS. 3 and 4, an embodiment of the present disclosure provides a thin film sensor, including a base substrate 10, a first conductive mesh 20 and a second conductive mesh 30. The first conductive mesh 20 is disposed on the base substrate 10. The second conductive mesh 30 is disposed on a side of the first conductive mesh 20 away from the base substrate 10. Specifically, the first conductive mesh 20 includes a plurality of first metal wires 21 arranged side by side along a first direction and each extending in a second direction, and a plurality of second metal wires 22 arranged side by side along the first direction and each extending in a third direction; and the plurality of first metal wires 21 intersect with the plurality of second metal wires 22. The second conductive mesh 30 includes a plurality of first transparent conductive wires 31 arranged side by side along the first direction and each extending in the second direction, and a plurality of second transparent conductive wires 32 arranged side by side along the first direction and each extending in the third direction; and the plurality of first transparent conductive wires 31 intersect with the plurality of second transparent conductive wires 32. In the embodiment of the present disclosure, each of the first transparent conductive wires 31 has an orthographic projection on the base substrate 10 covering an orthographic projection of one of the first metal wires 21 on the base substrate 10. Meanwhile, orthographic projections of different first transparent conductive wires 31 on the base substrate 10 cover orthographic projections of different first metal wires 21 on the base substrate 10, respectively. For example, the first metal wires 21 are disposed in correspondence with the first transparent conductive wires 31 one to one. Accordingly, each of the second transparent conductive wires 32 has an orthographic projection on the base substrate 10 covering an orthographic projection of one of the second metal wires 22 on the base substrate 10. Meanwhile, orthographic projections of different second transparent conductive wires 32 on the base substrate 10 cover orthographic projections of different second metal wires 22 on the base substrate 10, respectively. For example, the second metal wires 22 are disposed in correspondence with the second transparent conductive wires 32 one to one.

In the thin film sensor of the embodiment of the present disclosure, the first metal wires 21 in the first conductive mesh 20 are covered and protected by the first transparent conductive wires 31 in the second conductive mesh 30, and the second metal wires 22 in the first conductive mesh 20 are covered and protected by the second transparent conductive wires 32 in the second conductive mesh 30, thereby effectively preventing the first metal wires 21 and the second metal wires 22 from being broken at intersection nodes at which the first metal wires 21 intersect with the second metal wires 22. Meanwhile, the first transparent conductive wires 31 and the second transparent conductive wires 32 each are made of a transparent conductive material as the name implies, so that the optical transmittance of the thin film sensor will not be affected. In some examples, the base substrate 10 is a flexible thin film that may be made of a material including at least one of COP, polyimide (PI), or polyethylene terephthalate (PET). It will be appreciated that the base substrate 10 may also be made of glass or other materials, which are not enumerated here. In the embodiment of the present disclosure, the base substrate 10 being a COP thin film is taken as an example for explanation.

In some examples, the first metal wires 21 and the second metal wires 22 of the first conductive mesh 20 are disposed in a same layer and made of a same material. That is, they are formed in a single patterning process. The first metal wires 21 and the second metal wires 22 are made of a material including, but not limited to, at least one of copper (Cu), aluminum (Al), molybdenum (Mo), or silver (Ag). In the embodiment of the present disclosure, the case where the first metal wires 21 and the second metal wires 22 are made of Cu is taken as an example for explanation.

In some examples, the first transparent conductive wires 31 and the second transparent conductive wires 32 of the second conductive mesh 30 are disposed in a same layer and made of a same material. That is, they are formed in a single patterning process. The first transparent conductive wires 31 and the second transparent conductive wires 32 are made of a material including, but not limited to, a metal oxide, such as indium tin oxide (ITO), or the like. Apparently, the first transparent conductive wires 31 and the second transparent conductive wires 32 may be made of graphene or the like. In the embodiment of the present disclosure, the case where the first transparent conductive wires 31 and the second transparent conductive wires 32 are made of ITO is taken as an example for explanation.

In some examples, each first metal wire 21 and each second metal wire 22 have a same wire width, i.e., a first wire width; each first transparent conductive wire and each second transparent conductive wire have a same wire width, i.e., a second wire width. In the embodiment of the present disclosure, the second wire width is much greater than the first wire width. For example, a ratio of the first wire width to the second wire width ranges from 1:2 to 1:60, or ranges from 1:3 to 1:50. In some examples, the first wire width has a value ranging from 1 μm to 3 μm; and the second wire width has a value ranging from 10 μm to 50 μm. In the embodiment of the present disclosure, specific values and ratios of the first wire width and the second wire width may be specifically designed according to requirements for product performance, and the above values do not limit the protection scope of the present disclosure. In some examples, a ratio of a thickness of a layer w % here the first conductive mesh 20 is located to a thickness of a layer where the second conductive mesh 30 is located ranges from about 3:2 to about 18:1. For example, the ratio of the thickness of the layer where the first conductive mesh is located to thickness of the layer where the second conductive mesh is located is 5:1. Specifically, the first conductive mesh 20 has a thickness ranging from about 2000 Å to bout 7000 Å, and the second conductive mesh 30 has a thickness ranging from about 400 Å to 1350 Å. In the embodiment of the present disclosure, the specific thicknesses of the first conductive mesh 20 and the second conductive mesh 30 may be specifically defined according to product requirements, and the above parameters do not limit the protection scope of the present disclosure.

Figure 5:
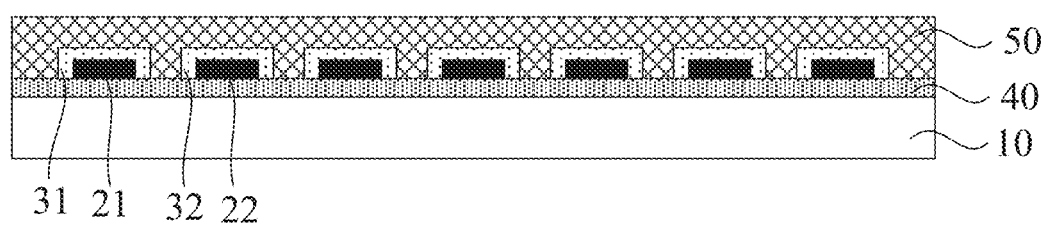
FIG. 5 is a schematic diagram of a sectional structure of a thin film sensor according to an embodiment of the present disclosure.

In some examples, FIG. 5 is a cross-sectional view of a thin film sensor according to an embodiment of the present disclosure. As shown in FIG. 5, the thin film sensor includes not only the first conductive mesh 20 and the second conductive mesh 30 described above, but also a shadow eliminating layer 40 between the base substrate 10 and the first conductive mesh 20. The shadow eliminating layer 40 has the same or substantially the same refractive index as the second conductive mesh 30. The shadow eliminating layer 40 having substantially the same refractive index as the second conductive mesh 30 means that a difference between the refractive index of the shadow eliminating layer 40 and the refractive index of the second conductive mesh 30 is less than 1%, or less than 0.5%. The reason for providing the shadow eliminating layer 40 is that since the second conductive mesh 30, used as a protective layer for protecting the first conductive mesh 20, has hollow-out regions, by providing the shadow eliminating layer 40 having the same or substantially the same refractive index as the second conductive mesh 30, a problem of shadow eliminating caused by the addition of the second conductive mesh 30 can be effectively avoided.

Further, the shadow eliminating layer 40 may have a single layer structure or a composite layer structure. For example, the shadow eliminating layer 40 may have a single-layer structure formed of silicon dioxide ($SiO_2$) or niobium oxide ($Nb_2O_5$); or the shadow eliminating layer 40 may have a two-layer structure formed of niobium oxide/silicon dioxide. The shadow eliminating layer 40 has a thickness ranging from about 100 Å to about 500 Å.

Figure 6:
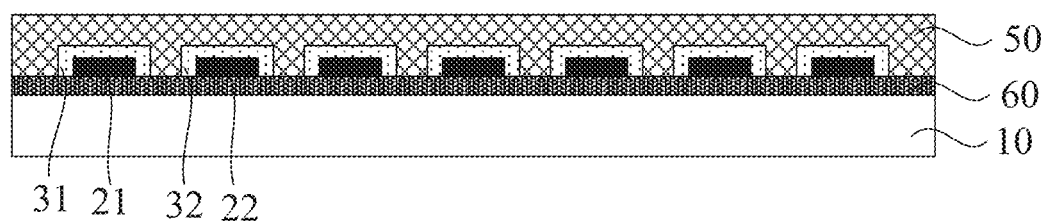
FIG. 6 is a schematic diagram of a sectional structure of a thin film sensor according to an embodiment of the present disclosure.

In some examples, FIG. 6 is a cross-sectional view of a thin film sensor according to an embodiment of the present disclosure. As shown in FIG. 6, the thin film sensor includes not only the structure as described above, but also a buffer layer 60 between the base substrate 10 and a layer where the first conductive mesh 20 is located. The provision of the buffer layer 60 facilitates formation of the first conductive mesh 20 on the base substrate 10. For example, the buffer layer 60 may include an inorganic material such as silicon oxide (SiOx), silicon nitride (SiNx), and/or silicon oxynitride (SiON), and may be formed as a multi-layer or single-layer structure.

Figure 7:
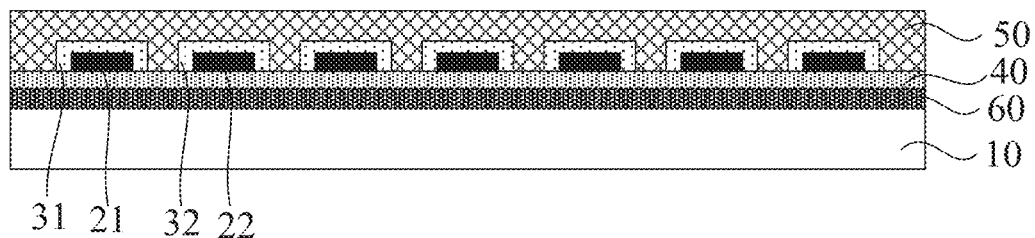
FIG. 7 is a schematic diagram of a sectional structure of a thin film sensor according to an embodiment of the present disclosure.

Additionally, FIG. 7 is a cross-sectional view of a thin film sensor according to an embodiment of the present disclosure. As shown in FIG. 7, when the thin film sensor includes the shadow eliminating layer 40 described above, the buffer layer 60 may not be provided in the thin film sensor. Apparently, the thin film sensor according to the embodiment of the present disclosure may be provided with both the shadow eliminating layer 40 and the buffer layer 60. In this case, the buffer layer 60 may be disposed between the base substrate 10 and the shadow eliminating layer 40, or may be disposed between the shadow eliminating layer 40 and the first conductive mesh 20, which is not particularly limited in the embodiment of the present disclosure.

In some examples, with continued reference to FIGS. 5 and 6, the thin film sensor include not only the structure as described above, but also a planarization layer 50 on a side of the second conductive mesh 30 away from the base substrate 10. The planarization layer 50 is configured to protect the second conductive layer from water and oxygen.

In the embodiment of the present disclosure, the planarization layer 50 may include an organic insulating material including, for example, a resin-based material such as polyimide, epoxy, acryl, polyester, photoresist, polyacrylate, polyamide, siloxane, or the like. As another example, the organic insulating material includes an elastic material, such as urethane, thermoplastic polyurethane (TPU), or the like. The planarization layer 50 has a thickness ranging from about 1 µm to 2 µm.

Figure 8:
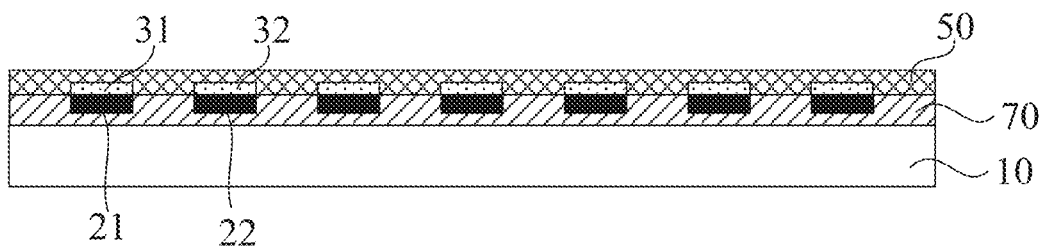
FIG. 8 is a schematic diagram of a sectional structure of a thin film sensor according to an embodiment of the present disclosure.

In some examples, FIG. 8 is a cross-sectional view of a thin film sensor according to an embodiment of the present disclosure. As shown in FIG. 8, the thin film sensor has substantially the same structure as the thin film sensor shown in FIG. 5, except that the buffer layer 60 and the shadow eliminating layer 40 are not provided in the thin film sensor, and instead, a first dielectric layer 70 is provided on the base substrate 10. The first dielectric layer 70 has a plurality of first groove parts arranged side by side along the first direction and each extending in the second direction, and a plurality of second groove parts arranged side by side along the first direction and each extending in the third direction. The plurality of first groove parts intersect with the plurality of second groove partsr. The first metal wires 21 are filled in the first groove parts, and each first groove part is filled with one first metal wire 21. For example, the first groove parts are disposed in correspondence with the first metal wires 21 one to one. The second metal wires 22 are filled in the second groove parts, and each second groove part is filled with one second metal wire 22. For example, the second groove parts are disposed in correspondence with the second metal wires 22 one to one.

In some implementations, each first groove part may be a through groove penetrating through the first dielectric layer 70 in a thickness direction of the first dielectric layer 70, or may be a blind groove penetrating only partial of the first dielectric layer 70 in the thickness direction of the first dielectric layer 70. In the embodiment of the present disclosure, each first groove part being a blind groove is taken as an example for explanation.

In some examples, the first dielectric layer 70 is made of a material including, but not limited to, an organic material including, for example, imprint glue, a resin-based material such as polyimide, epoxy, acryl, polyester, photoresist, polyacrylate, polyamide, siloxane, or the like. With the first dielectric layer made of an organic material, sidewalis of the first groove parts formed in a subsequent process can be perpendicular to a surface of the base substrate 10, thereby facilitating subsequent formation of the first conductive mesh 20 with a uniform wire width.

Other film layer structures of the thin film sensor in FIG. 8 may be the same as those shown in FIG. 5, and thus are not described in detail herein.

Figure 9:
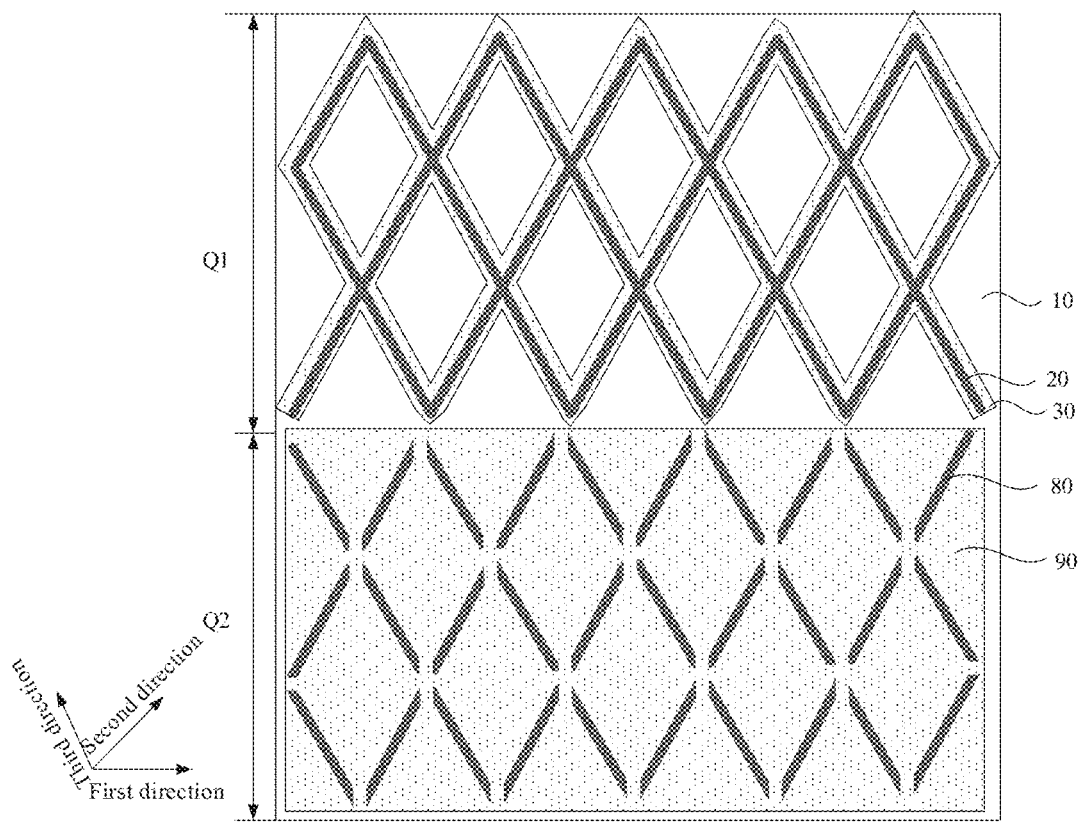
FIG. 9 is a schematic structural diagram of a thin film sensor according to an embodiment of the present disclosure.

In some examples, FIG. 9 is a top view of a thin film sensor according to an embodiment of the present disclosure. As shown in FIG. 9, the thin film sensor includes a functional region Q1 and a redundant region Q2; the first conductive mesh 20 and the second conductive metal mesh both are located in the functional region Q1; and the thin film sensor further includes a first redundant conductive mesh 80 and a redundant conductive layer 90 located in the redundant region Q2. The first redundant conductive mesh 80 is disposed in the same layer as the first conductive mesh 20, and is disconnected from the first conductive mesh 20. The first redundant conductive mesh 80 includes a plurality of first redundant metal wires arranged side by side along the first direction and each extending in the second direction, and a plurality of second redundant metal wires arranged side by side along the first direction and each extending in the third direction. Each of the first redundant metal wires is broken, in the direction in which the first redundant metal wire extends, at intersections at which the first redundant metal wire intersects with the second redundant metal wires, and each of the second redundant metal wires is broken, in the direction in which the second redundant metal wire extends, at intersections at which the second redundant metal wire intersects with the first redundant metal wires. The redundant conductive layer 90 is disposed in the same layer as the second conductive mesh 30 and is disconnected from the second conductive mesh 30. An orthographic projection of the redundant conductive layer 90 on the base substrate 10 covers an orthographic projection of the first redundant conductive mesh 80 on the base substrate 10. In this case, the first conductive mesh 20 in the functional region Q1 and the first redundant conductive mesh 80 in the redundant region Q2 may be formed in a single patterning process. Meanwhile, the second conductive mesh 30 in the functional region Q1 and the redundant conductive layer 90 in the redundant region Q2 may be formed in a single patterning process. Thus, process steps are not increased.

Figure 10:
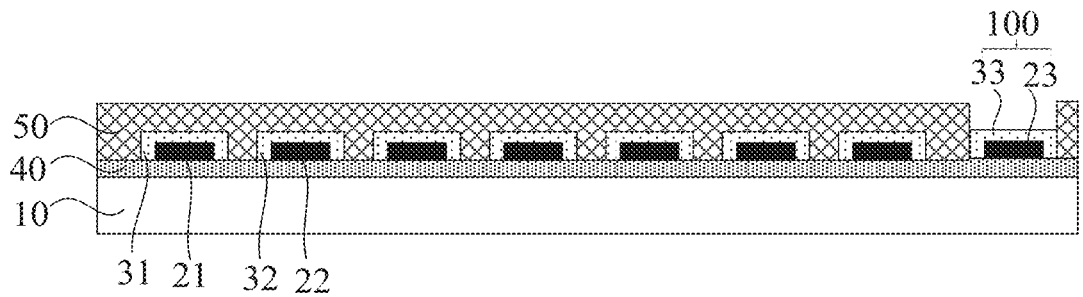
FIG. 10 is a schematic diagram of a sectional structure of a thin film sensor according to an embodiment of the present disclosure.

In some examples, FIG. 10 is a cross-sectional view of a thin film sensor according to an embodiment of the present disclosure. As shown in FIG. 10, the thin film sensor include not only the structure as described above, but also a connection pad 100 electrically connected to the first conductive mesh 20. It should be noted that since the first conductive mesh 20 includes the first metal wires 21 and the second metal wires 22, and the first metal wires 21 intersect with the second metal wires 22, in order to connect the first conductive mesh 20 to the connection pad 100, an end of each first metal wire 21 and an end of each second metal wire 22 are to be short-circuited/connected together, and then connected to the connection pad 100 through a signal lead-out wire. The signal lead-out wire may be disposed in a different layer from the first metal wires 21 and the second metal wires 22. In this case, an insulation layer is disposed between a layer where the signal lead-out wire is located and a layer where the first metal wires 21 and the second metal wires 22 are located, and the signal lead-out wire is desired to be electrically connected to the first metal wires 21 and/or the second metal wires 22 through a via penetrating through the insulation layer. When the signal lead-out wire is disposed in a different layer from the first metal wires 21 and the second metal wires 22, the signal lead-out wire may be made of a material different from that of the first metal wires 21 and the second metal wires 22. For example, the signal lead-out wire may be made of aluminum, and the first metal wires 21 and the second metal wires 22 may be made of copper. Apparently, merely exemplary materials of the signal lead-out wire, the first metal wires 21 and the second metal wires 22 are given above. In the embodiment of the present disclosure, the signal lead-out wire may be disposed in the same layer and made of the same material as the first metal wires 21 and the second metal wires 22. In this case, the signal lead-out wire, the first metal wires 21, and the second metal wires 22 may be prepared in a single patterning process, thereby reducing the process cost. In the embodiment of the present disclosure, the connection pad 100 may be disposed in the same layer and made of the same material as the signal lead-out wire. The connection pad 100 may further include a first sub-structure 23 and a second sub-structure 33. The first sub-structure 23 may be disposed in the same layer and made of the same material as the first metal wires 21 and the second metal wires 22. In this case, the first sub-structure 23 may be directly connected to the signal lead-out wire. The second sub-structure 33 may be disposed in the same layer and made of the same material as the second conductive mesh 30, and the second sub-structure 33 covers the first sub-structure 23. Compared with the existing connection pad 100, a layer of the second sub-structure 33 is additionally provided in the connection pad 100 of the present disclosure, thereby effectively improving the reliability of the connection pad 100.

Figure 11:
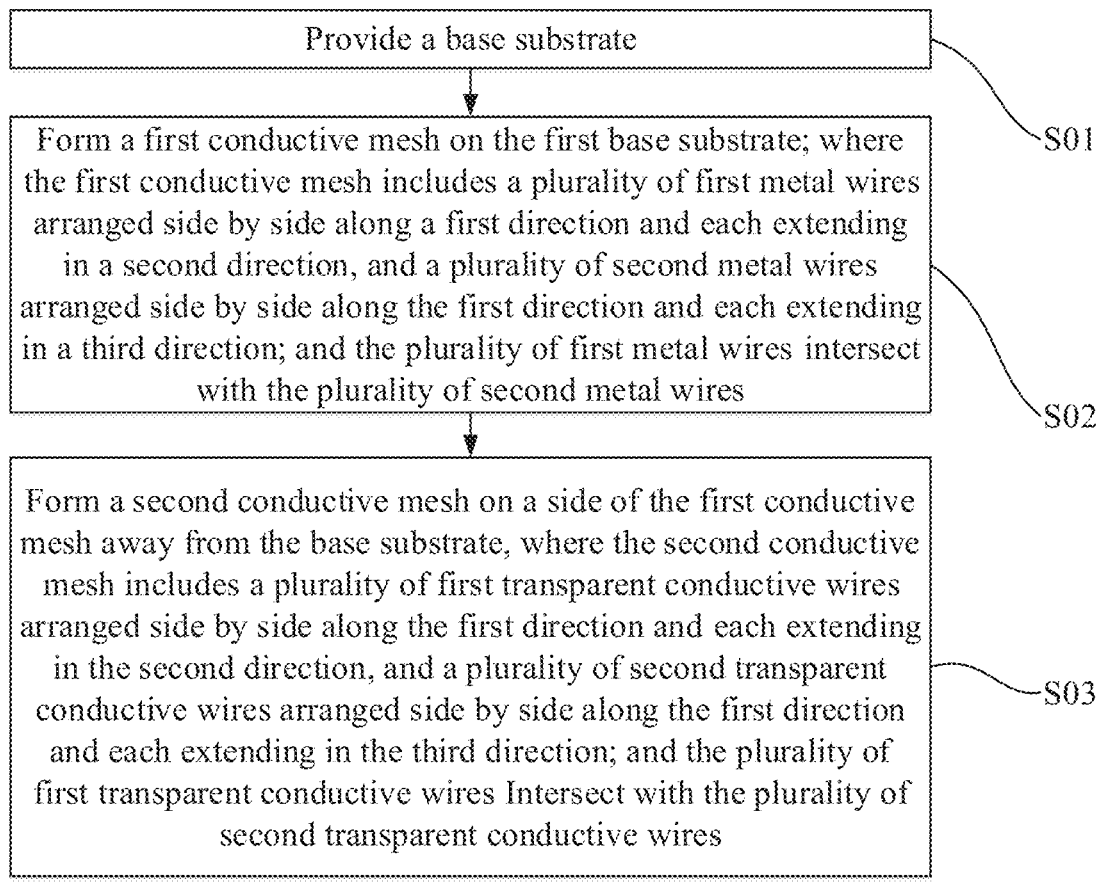
FIG. 11 is a flowchart of a method for preparing a thin film sensor according to an embodiment of the present disclosure.

In a second aspect, an embodiment of the present disclosure provides a method for preparing a thin film sensor, which can used for preparing any thin film sensor described above. FIG. 11 is a flowchart of a method for preparing a thin film sensor according to an embodiment of the present disclosure. As shown in FIG. 11, the method includes the following steps S01 to S03.

At S01, providing a base substrate 10.

At S02, forming a first conductive mesh 20 on the first base substrate 10, where the first conductive mesh 20 includes a plurality of first metal wires 21 arranged side by side along a first direction and each extending in a second direction, and a plurality of second metal wires 22 arranged side by side along the first direction and each extending in a third direction; and the plurality of first metal wires 21 intersect with the plurality of second metal wires 22.

At S03, forming a second conductive mesh 20 on a side of the first conductive mesh 30 away from the base substrate 10, where the second conductive mesh 30 includes a plurality of first transparent conductive wires 31 arranged side by side along the first direction and each extending in the second direction, and a plurality of second transparent conductive wires 32 arranged side by side along the first direction and each extending in the third direction; and the plurality of first transparent conductive wires 31 intersect with the plurality of second transparent conductive wires 32, In some implementations, each of the first transparent conductive wires 31 has an orthographic projection on the base substrate 10 covering an orthographic projection of one of the first metal wires 21 on the base substrate 10. Meanwhile, orthographic projections of different first transparent conductive wires 31 on the base substrate 10 cover orthographic projections of different first metal wires 21 on the base substrate 10, respectively. For example, the first metal wires 21 are disposed in correspondence with the first transparent conductive wires 31 one to one. Accordingly, each of the second transparent conductive wires 32 has an orthographic projection on the base substrate 10 covering an orthographic projection of one of the second metal wires 22 on the base substrate 10. Meanwhile, orthographic projections of different second transparent conductive wires 32 on the base substrate 10 cover orthographic projections of different second metal wires 22 on the base substrate 10, respectively. For example, the second metal wires 22 are disposed in correspondence with the second transparent conductive wires 32 one to one.

In the thin film sensor prepared by the method for preparing a thin film sensor according to the embodiment of the present disclosure, the first metal wires 21 in the first conductive mesh 20 are covered and protected by the first transparent conductive wires 31 in the second conductive mesh 30, and the second metal wires 22 in the first conductive mesh 20 are covered and protected by the second transparent conductive wires 32 in the second conductive mesh 30, thereby effectively preventing the first metal wires 21 and the second metal wires 22 from being broken at intersection nodes at which the first metal wires 21 intersect with the second metal wires 22. Meanwhile, the first transparent conductive wires 31 and the second transparent conductive wires 32 each are made of a transparent conductive material as the name implies, so that the optical transmittance of the thin film sensor will not be affected.

The following describes the method for preparing a thin film sensor according to the embodiment of the present disclosure with reference to specific examples.

First Example

Figure 12:
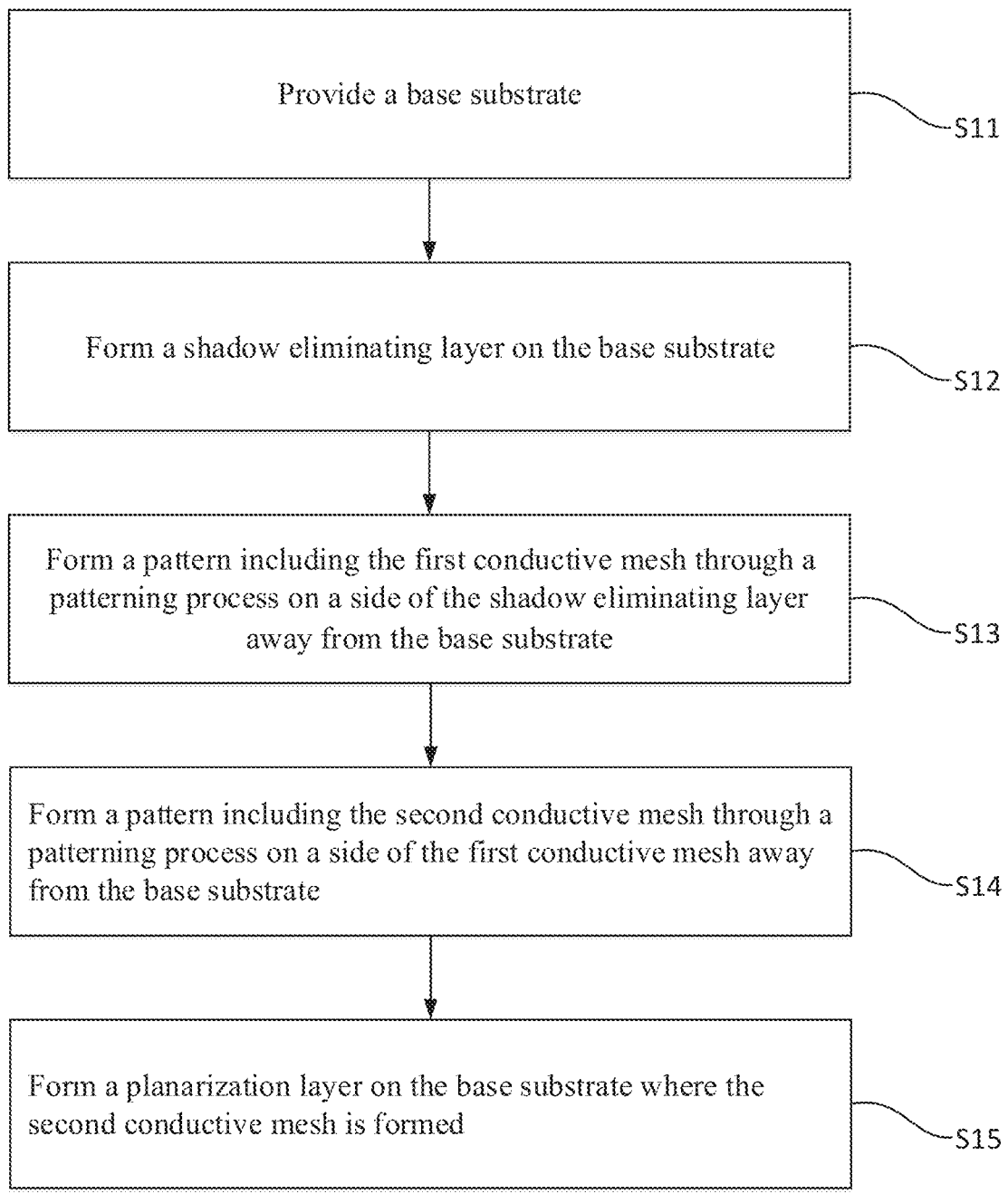
FIG. 12 is a flowchart of a method for preparing a thin film sensor according to an embodiment of the present disclosure.

FIG. 12 is a flowchart of a method for preparing a thin film sensor according to an embodiment of the present disclosure. As shown in FIG. 12, the method for preparing a thin film sensor specifically includes the following steps S11 to S15.

At S11, providing a base substrate 10.

In some examples, the base substrate 10 may be a flexible thin film that may be made of a material including at least one of COP, polyimide (PT), or polyethylene terephthalate (PET). In this case, step S1 may include cutting a flexible COP roll material, bonding a flexible COP thin film obtained by cutting to a glass substrate by an optically clear adhesive (OCA), and then cleaning the glass substrate on which the COP thin film is formed At S12, forming a shadow eliminating layer 40 on the base substrate 10, where the shadow eliminating layer 40 has the same or substantially the same refractive index as the second conductive mesh 30.

The shadow eliminating layer 40 having substantially the same refractive index as the second conductive mesh 30 means that a difference between the refractive index of the shadow eliminating layer 40 and the refractive index of the second conductive mesh 30 is less than 1%, or less than 0.5%. The reason for providing the shadow eliminating layer 40 is that since the second conductive mesh 30, used as a protective layer for protecting the first conductive mesh 20, has hollow-out regions, by providing the shadow eliminating layer 40 having the same or substantially the same refractive index as the second conductive mesh 30, a problem of shadow eliminating caused by the addition of the second conductive mesh 30 can be effectively avoided.

In some examples, the shadow eliminating layer 40 may have a single layer structure or a composite layer structure. For example, the shadow eliminating layer 40 may have a single-layer structure formed of silicon dioxide ($SiO_2$) or niobium oxide ($Nb_2O_5$); or the shadow eliminating layer 40 may have a two-layer structure formed of niobium oxide/silicon dioxide. The shadow eliminating layer 40 has a thickness ranging from about 100 Å to about 500 Å.

At S13, forming a pattern including the first conductive mesh 20 through a patterning process on a side of the shadow eliminating layer 40 away from the base substrate 10.

In some examples, step S13 may include forming a metal film on the shadow eliminating layer 40 by a method including but not limited to magnetron sputtering, spin coating a photoresist on a side of the metal film away from the base substrate 10, and performing exposing, developing and then etching, and stripping off the photoresist after the etching, so as to form the pattern including the first conductive mesh 20.

In some examples, if the thin film sensor further includes a first redundant conductive mesh 80, the first redundant conductive mesh 80 is formed simultaneously as the first conductive mesh 20. Thereafter, the first redundant conductive mesh 80 may be disconnected from the first conductive mesh 20 by laser, while the first redundant conductive mesh

80 is disconnected at intersection points at which the first redundant metal wires intersect with the second redundant metal wires.

In addition, if the thin film sensor further includes a connection pad 100 on the base substrate 10, a first sub-structure 23 of the connection pad 100 is formed simultaneously with the first conductive mesh 20.

At S14, forming a pattern including the second conductive mesh 30 through a patterning process on a side of the first conductive mesh 20 away from the base substrate 10.

In some examples, step S14 may specifically include forming a transparent conductive film on the shadow eliminating layer 40 by a method including but not limited to magnetron sputtering, spin coating a photoresist on a side of the transparent conductive film away from the base substrate 10, and performing exposing, developing and then etching, and stripping off the photoresist after the etching, so as to form the pattern including the second conductive mesh 30.

In some examples, if the thin film sensor further includes a redundant conductive layer 90, the redundant conductive layer 90 is formed simultaneously with the second conductive mesh 30, and the redundant conductive layer 90 is disconnected from the second conductive mesh 30.

In addition, if the thin film sensor further includes a connection pad 100 on the base substrate 10, a second sub-structure 33 of the connection pad 100 is formed simultaneously with the second conductive mesh 30. The second sub-structure 33 covers the first sub-structure 23.

At S15, forming a planarization layer 50 on the base substrate 10 on which the second conductive mesh 30 is formed.

In some examples, step S15 may include, but is not limited to, forming the planarization layer 50 on the second conductive mesh 30 by spin coating.

In some examples, if the connection pad 100 is formed on the thin film sensor, the planarization layer 50 is desired to be removed at a position corresponding to the connection pad 100 to expose the connection pad 100.

At S16, peeling the base substrate 10 from the glass substrate, and forming a protective film on a side of the base substrate 10 away from the first conductive mesh 20 and a side of the second conductive mesh 30 away from the base substrate 10.

In some examples, the protective film may be an inorganic insulation layer formed of silicon nitride (SiNx), or an inorganic insulation layer formed of silicon oxide (SiO2), or a composition film layer formed of a SiNx inorganic insulation layer and a SiO2 inorganic insulation layer which are stacked in several modes.

So far, preparation of the thin film sensor according to the embodiment of the present disclosure is completed It should be noted that in the preparation process of the thin film sensor, the above steps are usually implemented to form a plurality of thin film sensors. Therefore, to obtain one thin film sensor, a cutting step is further included to divide the plurality of thin film sensors into individual thin film sensors, and after the cutting step, a step of bonding the connection pad 100 of each thin film sensor is further included. These steps may be implemented through known processes, and thus are not described in detail here.

Second Example

Figure 13:
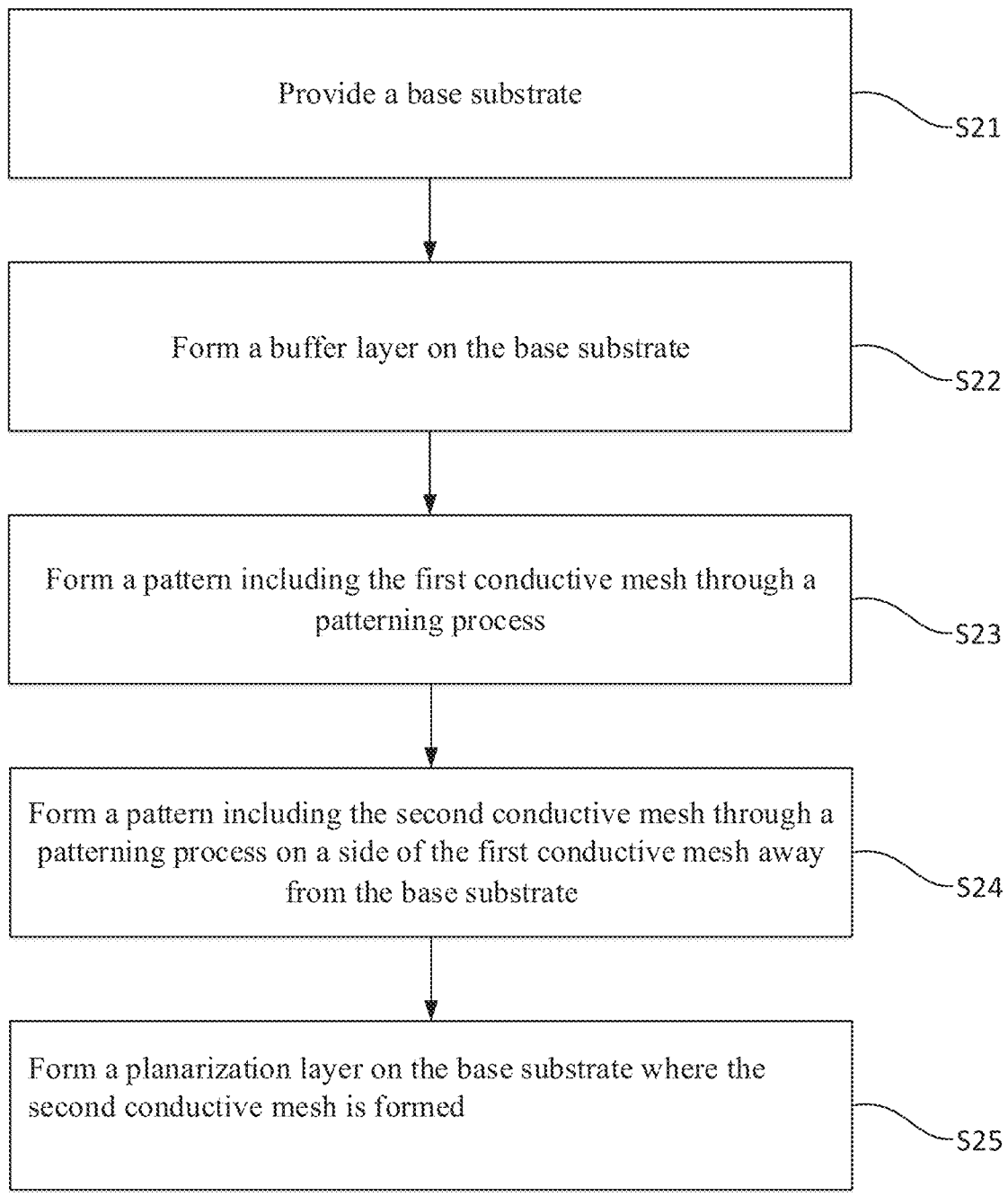
FIG. 13 is a flowchart of a method for preparing a thin film sensor according to an embodiment of the present disclosure.

FIG. 13 is a flowchart of a method for preparing a thin film sensor according to an embodiment of the present disclosure. As shown in FIG. 13, the method for preparing a thin film sensor specifically includes the following steps S21 to S25.

At S21, providing a base substrate 10.

In some examples, the base substrate 10 may be made of a flexible material as mentioned above, which is not repeated here. When the substrate is made of a flexible material, the flexible substrate may be transported by roll-to-roll in step S21.

At S22, forming a buffer layer 60 on the base substrate 10.

In some examples, step 822 may include forming the buffer layer 60 by vacuum magnetron sputtering.

At S23, forming a pattern including the first conductive mesh 20 through a patterning process.

In some examples, step S23 may include forming a metal film, such as a copper film, by vacuum magnetron sputtering, and thickening the copper film, e.g., to a thickness of 3 μm or more, through an electroplating process, spin coating a photoresist, performing exposing, developing and then etching, and stripping off the photoresist after the etching, so as to form the pattern including the first conductive mesh 20.

In some examples, if the thin film sensor further includes a first redundant conductive mesh 80, the first redundant conductive mesh 80 is formed simultaneously as the first conductive mesh 20. Thereafter, the first redundant conductive mesh 80 may be disconnected from the first conductive mesh 20 by laser, while the first redundant conductive mesh 80 is disconnected at intersection points at which the first redundant metal wires intersect with the second redundant metal wires.

In addition, if the thin film sensor further includes a connection pad 100 on the base substrate 10, a first sub-structure 23 of the connection pad 100 is formed simultaneously with the first conductive mesh 20.

At 824, forming a pattern including the second conductive mesh 30 through a patterning process on a side of the first conductive mesh 20 away from the base substrate 10.

In some examples, step S24 may specifically include forming a transparent conductive film on the shadow eliminating layer 40 by a method including but not limited to magnetron sputtering, spin coating a photoresist on a side of the transparent conductive film away from the base substrate 10, performing exposing, developing and then etching, and stripping off the photoresist after the etching, so as to form the pattern including the second conductive mesh 30.

In some examples, if the thin film sensor further includes a redundant conductive layer 90, the redundant conductive layer 90 is formed simultaneously with the second conductive mesh 30, and the redundant conductive layer 90 is disconnected from the second conductive mesh 30.

In addition, if the thin film sensor further includes a connection pad 100 on the base substrate 10, a second sub-structure 33 of the connection pad 100 is formed simultaneously with the second conductive mesh 30. The second sub-structure 33 covers the first sub-structure 23.

At S25, forming a planarization layer 50 on the base substrate 10 on which the second conductive mesh 30 is formed.

In some examples, step S15 may include, but is not limited to, forming the planarization layer 50 on the second conductive mesh 30 by spin coating.

In some examples, if the connection pad 100 is formed on the thin film sensor, the planarization layer 50 is desired to be removed at a position corresponding to the connection pad 100 to expose the connection pad 100, and finally a post-baking process is performed to cure the planarization layer 50.

Third Example

Figure 14:
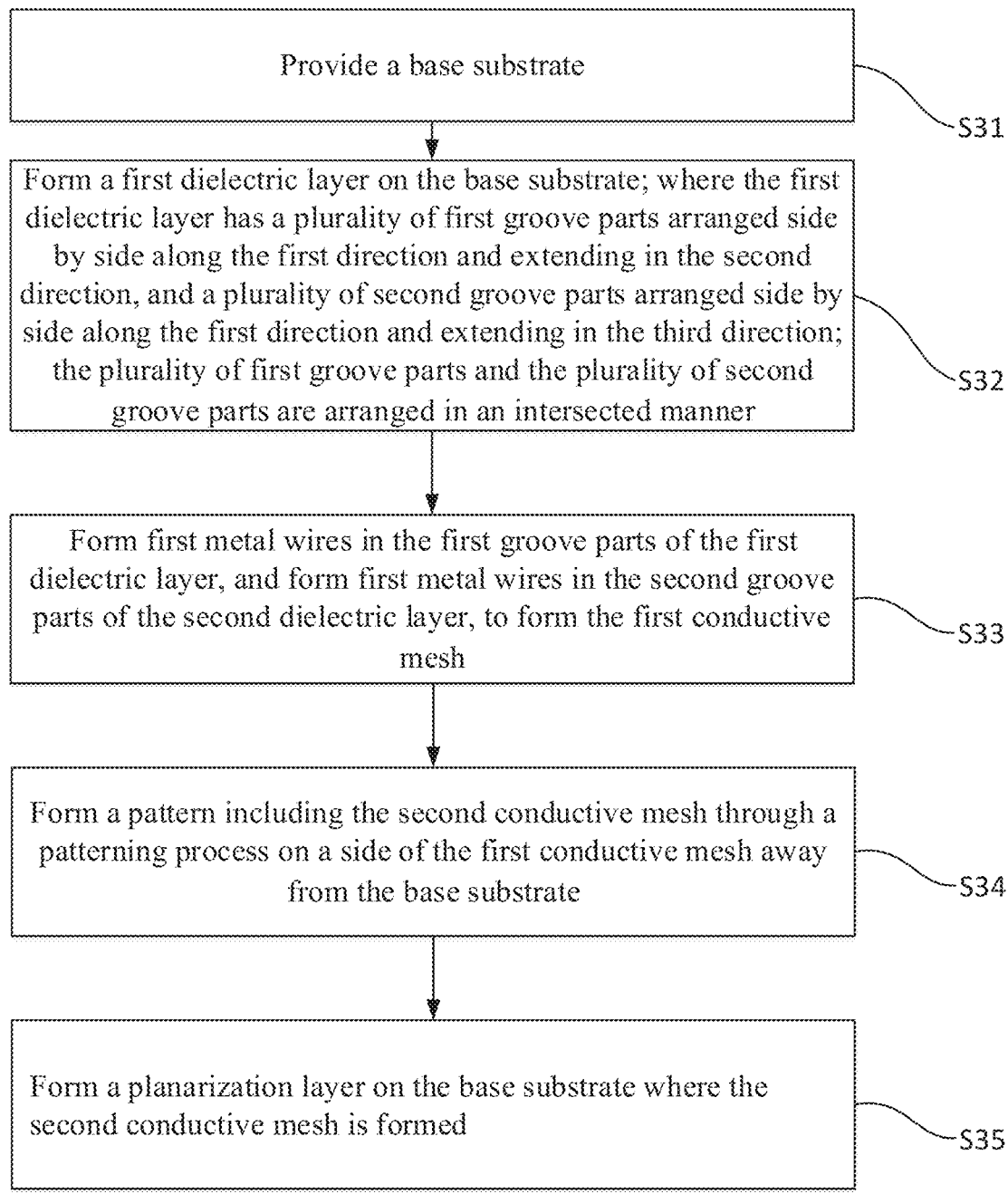
FIG. 14 is a flowchart of a method for preparing a thin film sensor according to an embodiment of the present disclosure.

FIG. 14 is a flowchart of a method for preparing a thin film sensor according to an embodiment of the present disclosure. As shown in FIG. 14, the method for preparing a thin film sensor specifically includes the following steps S31 to S35.

At S31, providing a base substrate 10.

In some examples, step S31 is the same as step 821, and thus is not repeated here.

At S32, forming a first dielectric layer 70 on the base substrate 10, where the first dielectric layer 70 has a plurality of first groove parts arranged side by side along the first direction and each extending in the second direction, and a plurality of second groove parts arranged side by side along the first direction and each extending in the third direction, and the plurality of first groove parts intersect with the plurality of second groove parts.

In some examples, the first dielectric layer 70 is made of a material including, but not limited to, an organic material including, for example, imprint glue, a resin-based material such as polyimide, epoxy, acryl, polyester, photoresist, polyacrylate, polyamide, siloxane, or the like. Taking the first dielectric layer 70 including imprint glue as an example, step S32 may include: coating the imprint glue on the base substrate 10, and then forming the first dielectric layer 70 having the first groove parts and the second groove parts through a micro-imprinting process.

At S33, forming first metal wires 21 in the first groove parts of the first dielectric layer 70, and forming second metal wires 22 in the second groove parts of the second dielectric layer 70, to form the first conductive mesh 20.

In some examples, step S33 may include: putting a side of the base substrate 10 formed with the first dielectric layer 70 on an electroplating machine carrier, pressing a power-up pad thereon and putting the whole into a hole-filling electroplating bath (with a special hole-filling electrolyte), applying a current to keep an electroplating solution continuously and quickly flowing on a surface of the base substrate 10, and electrons are obtained by cations in the electroplating solution on sidewalls of the first groove parts and the second groove parts to form atoms deposited on the sidewalls. With the special hole-filling electrolyte of a special proportion, it is possible to deposit metal copper mainly in the first groove parts and the second groove parts at a higher speed (ranging from about 0.5 um/min to about 3 um/min), while the metal copper is deposited on the first dielectric layer 70 at an extremely low speed (ranging from about 0.005 um/min to about 0.05 um/min). With the increase of time, the metal copper on the sidewalls of the first groove parts and the second groove parts gradually grows thicker, and even completely/fully fills the first groove parts and the second groove parts. Finally, the base substrate 10 is taken out to be washed with deionized water. Finally, the metal copper outside the first groove parts and the second groove parts is removed to form the first conductive mesh 20.

In some examples, if the thin film sensor further includes a first redundant conductive mesh 80, the first redundant conductive mesh 80 is formed simultaneously as the first conductive mesh 20. Thereafter, the first redundant conductive mesh 80 may be disconnected from the first conductive mesh 20 by laser, while the first redundant conductive mesh 80 is disconnected at intersection points at which the first redundant metal wires intersect with the second redundant metal wires.

In addition, if the thin film sensor further includes a connection pad 100 on the base substrate 10, a first sub-structure 23 of the connection pad 100 is formed simultaneously with the first conductive mesh 20.

At S34, forming a pattern including the second conductive mesh 30 through a patterning process on a side of the first conductive mesh 20 away from the base substrate 10.

In some examples, step S34 may specifically include forming a transparent conductive film on the shadow eliminating layer 40 by a method including but not limited to magnetron sputtering, spin coating a photoresist on a side of the transparent conductive film away from the base substrate 10, performing exposing, developing and then etching, and stripping off the photoresist, so as to form the pattern including the second conductive mesh 30.

In some examples, if the thin film sensor further includes a redundant conductive layer 90, the redundant conductive layer 90 is formed simultaneously with the second conductive mesh 30, and the redundant conductive layer 90 is disconnected from the second conductive mesh 30.

In addition, if the thin film sensor further includes a connection pad 100 on the base substrate 10, a second sub-structure 33 of the connection pad 100 is formed simultaneously with the second conductive mesh 30. The second sub-structure 33 covers the first sub-structure 23.

At S35, forming a planarization layer 50 on the base substrate 10 on which the second conductive mesh 30 is formed.

In some examples, step S35 may include, but is not limited to, forming the planarization layer 50 on the second conductive mesh 30 by spin coating.

In some examples, if the connection pad 100 is formed on the thin film sensor, the planarization layer 50 is desired to be removed at a position corresponding to the connection pad 100 to expose the connection pad 100.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should be considered as falling into the protection scope of the present disclosure.

What is claimed is:

1. A thin film sensor, comprising:
a base substrate;
a first conductive mesh on the base substrate; wherein the first conductive mesh comprises a plurality of first metal wires arranged side by side along a first direction and each extending in a second direction, and a plurality of second metal wires arranged side by side along the first direction and each extending in a third direction; and the plurality of first metal wires intersect with the plurality of second metal wires; and
a second conductive mesh on a side of the first conductive mesh away from the base substrate;
wherein the second conductive mesh comprises a plurality of first transparent conductive wires arranged side by side along the first direction and each extending in the second direction, and a plurality of second transparent conductive wires arranged side by side along the first direction and each extending in the third direction; and the plurality of first transparent conductive wires intersect with the plurality of second transparent conductive wires; and wherein each of the plurality of first transparent conductive wires has an orthographic projection on the base substrate covering an orthographic projection of one of the plurality of first metal wires on the base substrate; and each of the plurality of second transparent conductive wires has an orthographic projection on the base substrate covering an orthographic projection of one of the plurality of second metal wires on the base substrate.

2. The thin film sensor according to claim 1, further comprising:
a shadow eliminating layer between the base substrate and a layer where the first conductive mesh is located, and a difference between a refractive index of the shadow eliminating layer and a refractive index of the second conductive mesh is less than about 1%.

3. The thin film sensor according to claim 1, further comprising:
a buffer layer between the base substrate and a layer where the first conductive mesh is located.

4. The thin film sensor according to claim 1, further comprising:
a first dielectric layer on the base substrate, where the first dielectric layer is provided with a plurality of first groove parts arranged side by side along the first direction and each extending in the second direction, and a plurality of second groove parts arranged side by side along the first direction and each extending in the third direction; the plurality of first groove parts intersect with the plurality of second groove parts; the first metal wires are filled in the first groove parts, and each first groove part is filled with one first metal wire; and the second metal wires are filled in the second groove parts, and each second groove part is filled with one second metal wire.

5. The thin film sensor according to claim 1, further comprising:
a planarization layer on a side of the second conductive mesh away from the base substrate.

6. The thin film sensor according to claim 1,
wherein each of the first metal wires and the second metal wires has a first wire width; each of the first transparent conductive wires and the second transparent conductive wires has a second wire width; and a ratio of the first wire width to the second wire width ranges from about 1:2 to about 1:60.

7. The thin film sensor according to claim 6, wherein the first wire width has a value ranging from about 1 μm to about 3 μm; and the second wire width has a value ranging from about 10 μm to about 50 μm.

8. The thin film sensor according to claim 1, further comprising:
a first redundant conductive mesh in the same layer as the first conductive mesh and disconnected from the first conductive mesh; wherein the first redundant conductive mesh comprises a plurality of first redundant metal wires arranged side by side along the first direction and each extending in the second direction, and a plurality of second redundant metal wires arranged side by side along the first direction and each extending in the third direction; each of the first redundant metal wires is broken, in the direction in which the first redundant metal wire extends, at intersections at which the first redundant metal wire intersects with the second redundant metal wires, and each of the second redundant metal wires is broken, in the direction in which the second redundant metal wire extends, at intersections at which the second redundant metal wire intersects with the first redundant metal wires;

a redundant conductive layer in the same layer as the second conductive mesh and disconnected from the second conductive mesh; wherein an orthographic projection of the redundant conductive layer on the base substrate covers an orthographic projection of the first redundant conductive mesh on the base substrate.

9. The thin film sensor according to claim 1, further comprising:
a connection pad comprising a first sub-structure and a second sub-structure sequentially arranged in a direction away from the base substrate; the first sub-structure is disposed in the same layer as the first conductive mesh and is electrically connected to the first conductive mesh;
and the second sub-structure is disposed in the same layer as the second conductive mesh and covers the first sub-structure.

10. The thin film sensor according to claim 1,
wherein the first metal wires and the second metal wires each are made of a material comprising at least one of copper, aluminum, molybdenum or silver.

11. The thin film sensor according to claim 1,
wherein the first transparent conductive wires and the second transparent conductive wires each are made of a material comprising indium tin oxide.

12. The thin film sensor according to claim 1,
wherein a ratio of a thickness of a layer where the first conductive mesh is located to a thickness of a layer where the second conductive mesh is located ranges from about 3:2 to about 18:1.

13. The thin film sensor according to claim 1,
wherein the first conductive mesh has a thickness ranging from about 2000 Å to about 7000 Å, and the second conductive mesh has a thickness ranging from about 400 Å to about 1350 Å.

14. A method for preparing a thin film sensor, comprising:
providing a base substrate;
forming a first conductive mesh on the first base substrate; wherein the first conductive mesh comprises a plurality of first metal wires arranged side by side along a first direction and each extending in a second direction, and a plurality of second metal wires arranged side by side along the first direction and each extending in a third direction; and the plurality of first metal wires intersect with the plurality of second metal wires; and
forming a second conductive mesh on a side of the first conductive mesh away from the base substrate, wherein the second conductive mesh comprises a plurality of first transparent conductive wires arranged side by side along the first direction and each extending in the second direction, and a plurality of second transparent conductive wires arranged side by side along the first direction and each extending in the third direction; and the plurality of first transparent conductive wires intersect with the plurality of second transparent conductive wires; and wherein each of the plurality of first transparent conductive wires has an orthographic projection on the base substrate covering an orthographic projection of one of the plurality of first metal wires on the base substrate; and each of the plurality of second transparent conductive wires has an orthographic projection on the base substrate covering an orthographic projection of one of the plurality of second metal wires on the base substrate.

15. The method according to claim 14, wherein before forming the first conductive mesh, the method further comprises:

forming a shadow eliminating layer on the base substrate, wherein a difference between a refractive index of the shadow eliminating layer and a refractive index of the second conductive mesh is less than about 1%.

16. The method according to claim 14, wherein before forming the first conductive mesh, the method further comprises:
   forming a buffer layer on the base substrate.

17. The method according to claim 14, wherein before forming the first conductive mesh, the method further comprises:
   forming a first dielectric layer on the base substrate by micro-imprinting; wherein the first dielectric layer is provided with a plurality of first groove parts arranged side by side along the first direction and each extending in the second direction, and a plurality of second groove parts arranged side by side along the first direction and each extending in the third direction; the plurality of first groove parts intersect with the plurality of second groove parts; the first metal wires are filled in the first groove parts, and each first groove part is filled with one first metal wire; and the second metal wires are filled in the second groove parts, and each second groove part is filled with one second metal wire.

18. The method according to claim 14, wherein
   after forming the second conductive mesh, the method further comprises: forming a first planarization layer on a side of a layer, where the second conductive mesh is located, away from the base substrate.

19. The method according to claim 14, wherein
   a first redundant conductive mesh is formed simultaneously as the first conductive mesh;
   the first redundant conductive mesh is disconnected from the first conductive mesh; the first redundant conductive mesh comprises a plurality of first redundant metal wires arranged side by side along the first direction and each extending in the second direction, and a plurality of second redundant metal wires arranged side by side along the first direction and each extending in the third direction; each of the first redundant metal wires is broken, in the direction in which the first redundant metal wire extends, at intersections at which the first redundant metal wire intersects with the second redundant metal wires, and each of the second redundant metal wires is broken, in the direction in which the second redundant metal wire extends, at intersections at which the second redundant metal wire intersects with the first redundant metal wires;
   a redundant conductive layer is formed simultaneously with the second conductive mesh;
   the redundant conductive layer is disconnected from the second conductive mesh; and an orthographic projection of the redundant conductive layer on the base substrate covers an orthographic projection of the first redundant conductive mesh on the base substrate.

20. The method according to claim 14, further comprising:
   forming a connection pad on the base substrate,
   the forming a connection pad on the base substrate comprises: forming a first sub-structure of the connection pad simultaneously with the first conductive mesh, the first sub-structure being connected to the first conductive mesh, and forming a second sub-structure of the connection pad simultaneously with the second conductive mesh, the second sub-structure covering the first sub-structure.

* * * * *